US008135668B2

(12) United States Patent
Joseph et al.

(10) Patent No.: US 8,135,668 B2

(45) Date of Patent: Mar. 13, 2012

(54) SERVICE COMPOSITION ENVIRONMENT

(75) Inventors: Joshy Joseph, Redmond, WA (US); Anand C. Ramanathan, Bellevue, WA (US); Arun Chandrasekhar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/517,858

(22) Filed: Sep. 6, 2006

(65) Prior Publication Data

US 2008/0059450 A1 Mar. 6, 2008

(51) Int. Cl.
*G06F 7/00* (2006.01)

(52) U.S. Cl. ........................................ 707/608; 707/705

(58) Field of Classification Search ............. 707/5, 608, 707/705

See application file for complete search history.

(56) References Cited

U.S. PATENT DOCUMENTS

| | | | | |
|---|---|---|---|---|
| 6,119,147 | A | 9/2000 | Toomey | 709/204 |
| 6,405,195 | B1 * | 6/2002 | Ahlberg | 707/4 |
| 6,917,938 | B2 | 7/2005 | Shea | 1/1 |
| 6,928,396 | B2 | 8/2005 | Thackston | 703/1 |
| 7,219,107 | B2 * | 5/2007 | Beringer | 707/104.1 |
| 2002/0052769 | A1 | 5/2002 | Navani | 719/316 |
| 2002/0073163 | A1 | 6/2002 | Churchill | 709/214 |
| 2004/0098476 | A1 | 5/2004 | Kawase | 709/223 |
| 2005/0049882 | A1 * | 3/2005 | Sawka | 705/1 |
| 2005/0060371 | A1 | 3/2005 | Cohen | 709/205 |
| 2005/0138118 | A1 * | 6/2005 | Banatwala et al. | 709/204 |
| 2005/0144250 | A1 | 6/2005 | Banatwala | 709/215 |
| 2005/0149367 | A1 * | 7/2005 | Lee et al. | 705/7 |
| 2006/0005187 | A1 | 1/2006 | Neil | 718/1 |
| 2006/0070003 | A1 | 3/2006 | Thompson | 715/758 |
| 2006/0075129 | A1 * | 4/2006 | Geppert et al. | 709/230 |
| 2007/0016557 | A1 * | 1/2007 | Moore et al. | 707/3 |
| 2007/0050484 | A1 * | 3/2007 | Oertig et al. | 709/220 |

FOREIGN PATENT DOCUMENTS

| | | |
|---|---|---|
| WO | WO02/097616 | 12/2002 |

OTHER PUBLICATIONS

Burak, A., et al.; "*Usage Patterns of FriendZone—Mobile Location-Based Community Services*"; accessed Apr. 18, 2006 at http://delivery.acm.org/10.1145/1060000/1052394/p93-burak.pdf?key1=1052394&key2=8904525411&coll=GUIDE&dl=GUIDE&CFID=73870553&CFTOKEN=58625086; 8 pgs.

Fox, G., et al.; "*Integration of Hand-Held Devices into Collaborative Environments*"; accessed Apr. 18, 2066 at http://grids.ucs.indiana.edu/ptliupages/projects/carousel/papers/PDA_IC2002.pdf; 8 pgs.

Kawada, M., et al.; "*A User-Oriented Presence Synthesizing System for Facilitating On-Line Communication*"; The University of Tokyo; accessed Apr. 18, 2006 at http://www.mlab.t.u-tokyo.ac.jp/publications/2004/kawada-SAINT-05.pdf; 4 pgs.

Sun Microsystems; "*Implementing Services on Demand With the Sun™ Open Net Environment—Sun ONE*"; Palo Alto, CA, USA; Oct. 2001; 44 pgs.; accessed Apr. 18, 2006 at http://www.sun.com/software/whitepapers/webservices/wp-implement.pdf.

* cited by examiner

*Primary Examiner* — Jensen Hu

(74) *Attorney, Agent, or Firm* — Merchant & Gould

(57) ABSTRACT

A service composition environment is used to create a collaborative application that links services, composite services as well as with other collaborative applications. An application that is created using the service composition environment may include any combination of composite services, individual services and aggregated composite services. Metadata is obtained from the services that includes functional and non-functional policies, governance regulations, management aspects, and programmable binding information that relates to the services.

19 Claims, 18 Drawing Sheets

900

```xml
<?xml version="1.0" encoding="utf-8" ?>
<ContextDefinition name="Mobile Device Setup">
    <ContextServer location="http://localhost:8085/SayHello" />
    <Configuration>
        <ConfigurationItem key="Security Services" value="http://localhost/
          SecurityService/SecurityService.asmx" />
    </Configuration>
    <Participant type="User">
        <Service>Security Services</Service>
        <UserID>test</UserID>
        <Password>xxxx</Password>
        <WSDL>http://localhost/SecurityService/SecurityService.asmx</WSD>
    </Participant>
    <Participant type="Webservice">
        <ServiceCategory>Email Provider Service Provider</ServiceCategory>
        <ServiceName>Email Provider</ServiceName>
        <WSDL>http://localhost/Emailprovider/Emailprovider.asmx</WSDL>
    </Participant>
    <Participant type="Webservice">
        <ServiceCategory>Mobile Device Setup Service Provider</ServiceCategory>
        <ServiceName>Mobile Device Setup</ServiceName>
        <WSDL>http://localhost/MobileProvisioning/MobileProvisioning.asmx</
        WSDL>
    </Participant>
</ContextDefinition>
```

```
<Context>
 <ContextManifest timestamp="09/01/2006 00:00:00"        serialize="Serialize"
  state="State"RouteAnyAction="False" AckOnRouteMsgToParticipant = "False">
  <ContextName>ContextName</ContextName>
  <ContextID>ContextID</ContextID>
  <Participants>
    <Participant>
      <ParticipantManifest timeout="09/01/2006 00:00:00" role="Role" mode="Mode"
      type="False" service="http://msdn.com">
       <ParticipantName>"09/01/2006 00:00:00"</ParticipantName>
       <ParticipantUrl>"False"</ParticipantURL>
       <Actions>"Actions"</Actions>
      </ParticipantManifest>
    </Participant>
    <Participant>
      <ParticipantManifest timeout="01/01/0001 00:00:00" role="Role" mode="Mode"
      type="False" service="http://msdn.com">
       <ParticipantName>"01/01/0001 00:00:00"</ParticipantName>
       <ParticipantUrl>"False"</ParticipantURL>
       <Actions>"Actions"</Actions>
      </ParticipantManifest>
    </Participant>
  </Participants>
```

```
<Actions>Actions4</Actions>
        <RoutingTable>
            <Routes>
            <Route>
                <Criteria>Participant 2</Criteria>
                <Intercept />
                <Destination>Participant 4</Destination>
            </Route>
            <Route>
               <Criteria>Participant 4</Criteria>
               <Intercept />
               <Destination>Participant 5</Destination>
          </Route>
         </Routes>
        </RoutingTable>
       </ParticipantManifest>
      </Participant>
     <Participant>
     <ParticipantManifest timeout="01/01/0001 00:00:00" role="0" mode= "" type="">
        <ParticipantName>Participant 5</ParticipantName>
        <ParticipantUrl>False</ParticipantUrl>
        <Actions />
        <RoutingTable>
       <Routes>
        <Route>
            <Criteria>Participant 4</Criteria>
            <Intercept />
            <Destination>Participant 5</Destination>
        </Route>
      </Routes>
    </RoutingTable>
   </ParticipantManifest>
  </Participant>
 </Participants>
</ContextManifest>
</Context>
```

*Fig.15*

SERVICE COMPOSITION ENVIRONMENT

BACKGROUND

Some software products have the ability to link services to create a collaborative application. These software products link services, such as Web Services, together by describing the interactions of the messages between the services, the content of the messages, as well as the timing of the messages between the services within the collaborative application. These exchanges between the different services, however, may be very complex and difficult to describe.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A service composition environment is used to create a collaborative application that links services, composite services as well as with other collaborative applications. An application that is created using the service composition environment may include any combination of composite services, individual services and aggregated composite services. Metadata is obtained from the services are included within the service composition environment. The metadata information includes functional and non-functional policies, governance regulations, management aspects, and programmable binding information that relates to the services. In addition the composition environment could dynamically discover and enforce runtime policy driven meta behaviors on the service composition aspects. The service composition environment provides a graphical representation for defining the relationships and setting the properties relating to the individual services and composite services.

BRIEF DESCRIPTION OF THE DRAWINGS

FIGS. 5-9 illustrate building a composite application using a virtual collaborative environment;

FIG. 12 shows an XML report for the classes that are displayed on the work area;

FIGS. 13-15 illustrate an exemplary context model in which a context can be referred to as the base model itself;

DETAILED DESCRIPTION

Figure 1:
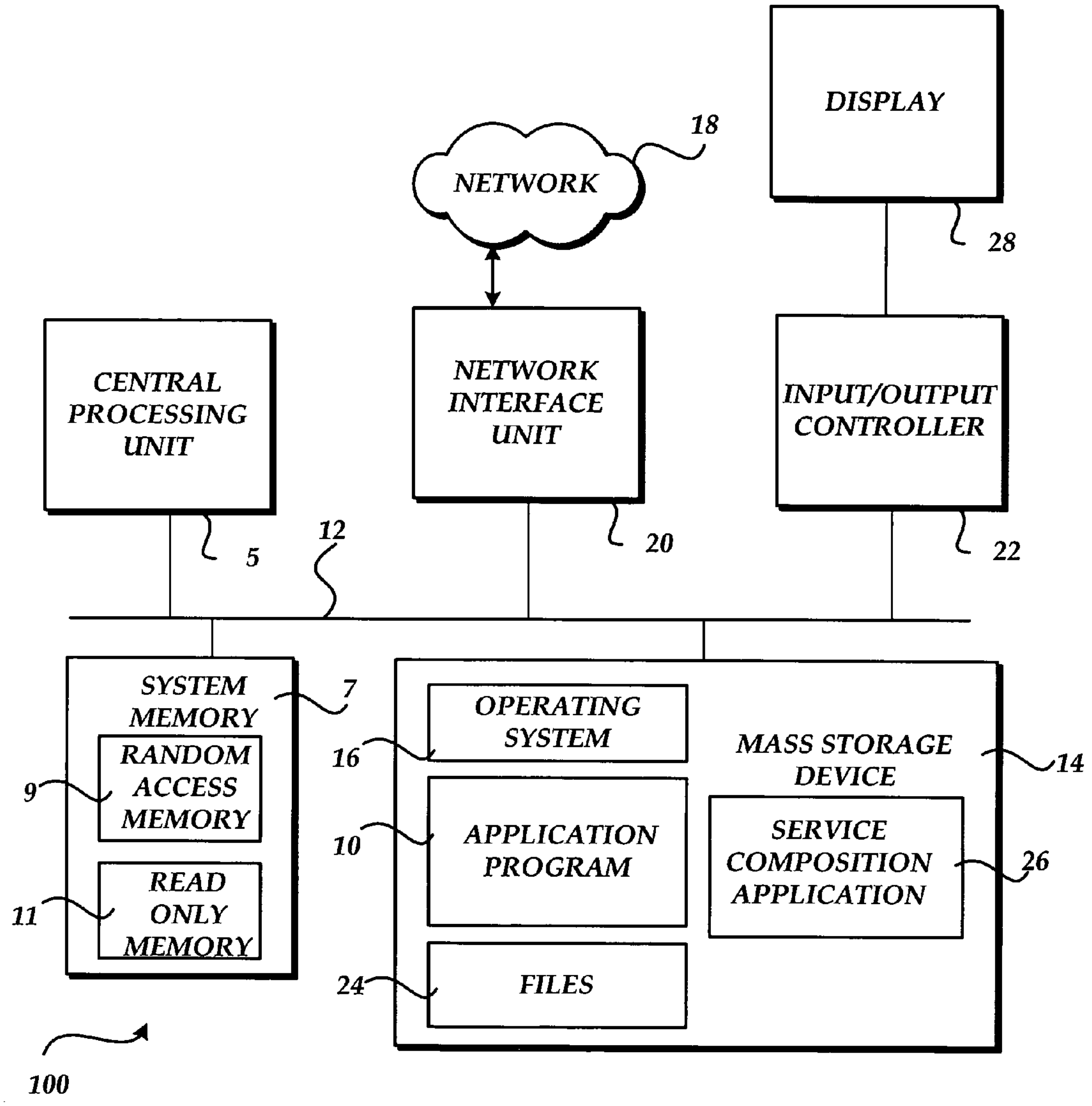
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an application program 10. The application program 10 is operative to provide a service composition development environment. According to one embodiment, the application program 10 comprises the MICROSOFT VISUAL STUDIO application program from MICROSOFT CORPORATION. Other application programs that provide an integrated development environment from other manufacturers may also be modified to include the functionality of the service composition environment described herein. Many of these products are known as orchestration products. These orchestration products are directed to reusing existing services to create an application by defining the flow between the services included within the application.

The application program 10 may utilize a service composition application 26. Although service composition application 26 is shown separate from application program 10, it may be included within application program 10. As will be described in greater detail below, the service composition application 26 is used to create a collaborative application that may itself include one or more collaborative applications that are combined with one or more individual services and composite services.

Figure 2:
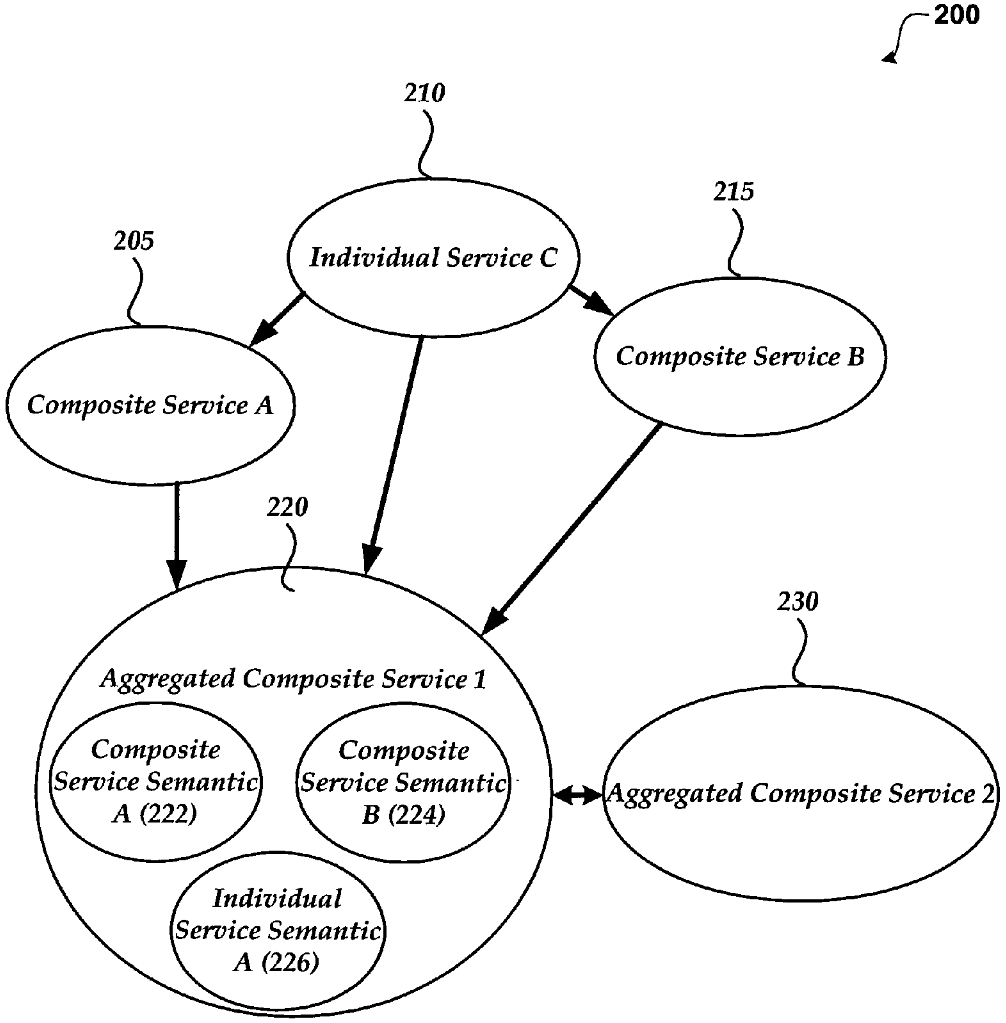
FIG. 2 illustrates a diagram that links composite services.

FIG. 2 illustrates a diagram that links composite services, individual services and aggregated composite services. As illustrated, composite service environment 200 includes composite service 205, individual service 210, composite service 215, aggregated composite service 220 and aggregated composite service 230. Aggregated composite service 220 includes service semantics (222, 224 and 226) for composite service 205, individual service 210, and composite service 215.

The services are linked together using a service composition environment that allows a user to place services within a work area and define the connections and properties relating to the services. Each of the services whether an individual service, a composite service or an aggregated composite service expose meta information that allows routing rules to be created between the services whether they be individual services, composite services or aggregated composite services. The meta information may also be used to combine individual services into a composite service. According to one embodiment, the service composition environment provides a graphical design tool that allows a user to edit the connections of the services and applications within a graphical interface. Generally, the graphical tool allows a user to compose services, define message routing rules between services based on the meta information discovered from the services and create a collaboration context for dynamic experiences. As illustrated, individual service 210 is configured to send messages to composite services 205 and 210 and aggregated composite service 220. Composite services 205 and 215 are configured to send messages to aggregated composite service 220 and the aggregated composite services 220 and 230 are configured to send messages between each other. The information defining the services, composite services, aggregated composite services along with the meta information and the rules between the services may collectively be referred to as a collaborative context.

Figure 3:
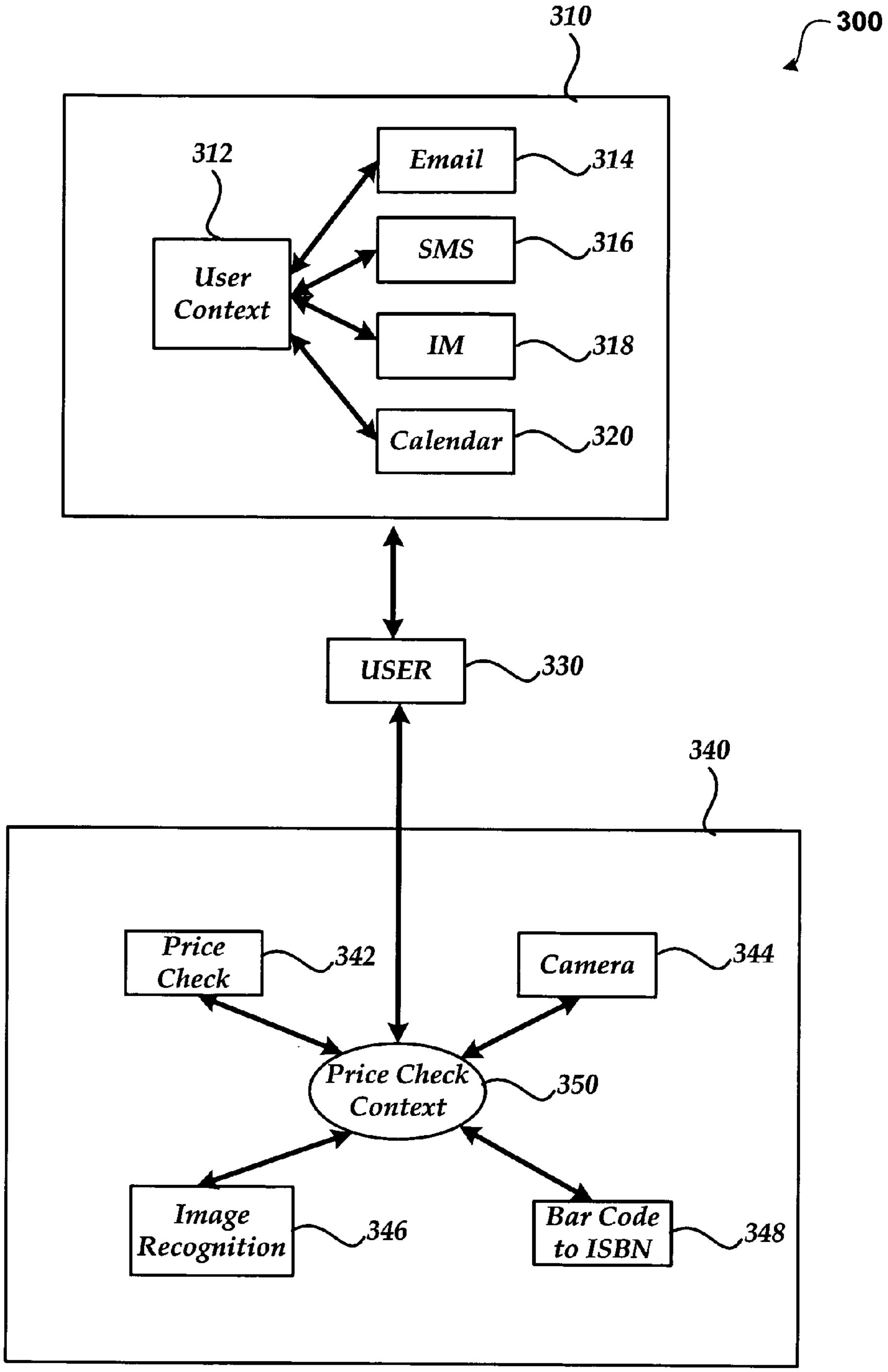
FIG. 3 illustrates an example of linking composite services.

FIG. 3 illustrates an example of linking composite services. The example provided is not intended to be limiting, but may be used for explanatory purposes.

As an example, consider a composite service 310 that represents a user as a composite of his communication device and location services including a mobile device that includes an email application 314; a SMS application 315; an instant messaging and a calendar application 320. User context 312 defines the rules relating to the composite service. When a message is sent to the user, depending on the message format and the rules that are contained within user context 312 that determine the location of the user, the message is sent to the user by the appropriate communication medium depending on the situation. Suppose that user context 312 includes a policy that if the user 330 is in a meeting, as may be determined from calendar application 320, then the rule specifies to use SMS application to send user 330 an SMS message to the user's mobile device. The rules defined by user context 312 may specify that in all other situations that when a message is received to use whatever communication method is chosen. According to another embodiment, composite service 310 could include one or more predefined context services, For example, predefined context services could provide information regarding the user's identity, presence, location as well as other related information that is associated with the user.

A price checking composite application 340 is also illustrated that determines the price of a book or some other item. Composite application 340 includes a price check context 350 that defines the interactions between price check service 342, camera service 344, image recognition service 346 and bar code to ISBN service 348 where user 330 desires to find the price of a book by using an ISBN number.

Now suppose that user 330 wants to find the price of a book from price checking composite service 340 but also wants the results delivered according to the user's composite service 310. When the user sends an image of the book's ISBN number, the price check context receives the image and the image recognition service 346 receives the image; extracts the ISBN number and sends the ISBN number to the book price check service 342 to determine a price. Price check context now returns the located price to user 330. Without a method to link the composite service applications, the price check service application would provide the user 330 with whatever its default method of sending the price. For example, if composite price checking service 340 sends the price as an email then user 330 would receive an email even though user 330 may be in a meeting. In this example, however, the user 330 has a composite service that represents the user that is linked with composite service 340. In other words, the composite service 310 representing user 330 participates in the book price check service just as if it were a service. When the price of the book is returned to the user composite service 310, depending on where the user is located, the user receives this price by email or by SMS, or some other method as specified by a rule within user context 312.

In order to link the composite services, a service composition environment illustrated herein allows users to construct service oriented applications using existing services or composite of services that simplifies importing those applications as services into other service oriented applications. At runtime, the application created within the service composition environment collaborates with the composite service and the application logic behind the composite service is executed. This collaboration is achieved based on the contextual information such as policies, service behaviors, and governance gathered from services taking part in the scenario, and other meta-information such as user's presence, location, trust and identity.

Figure 4:
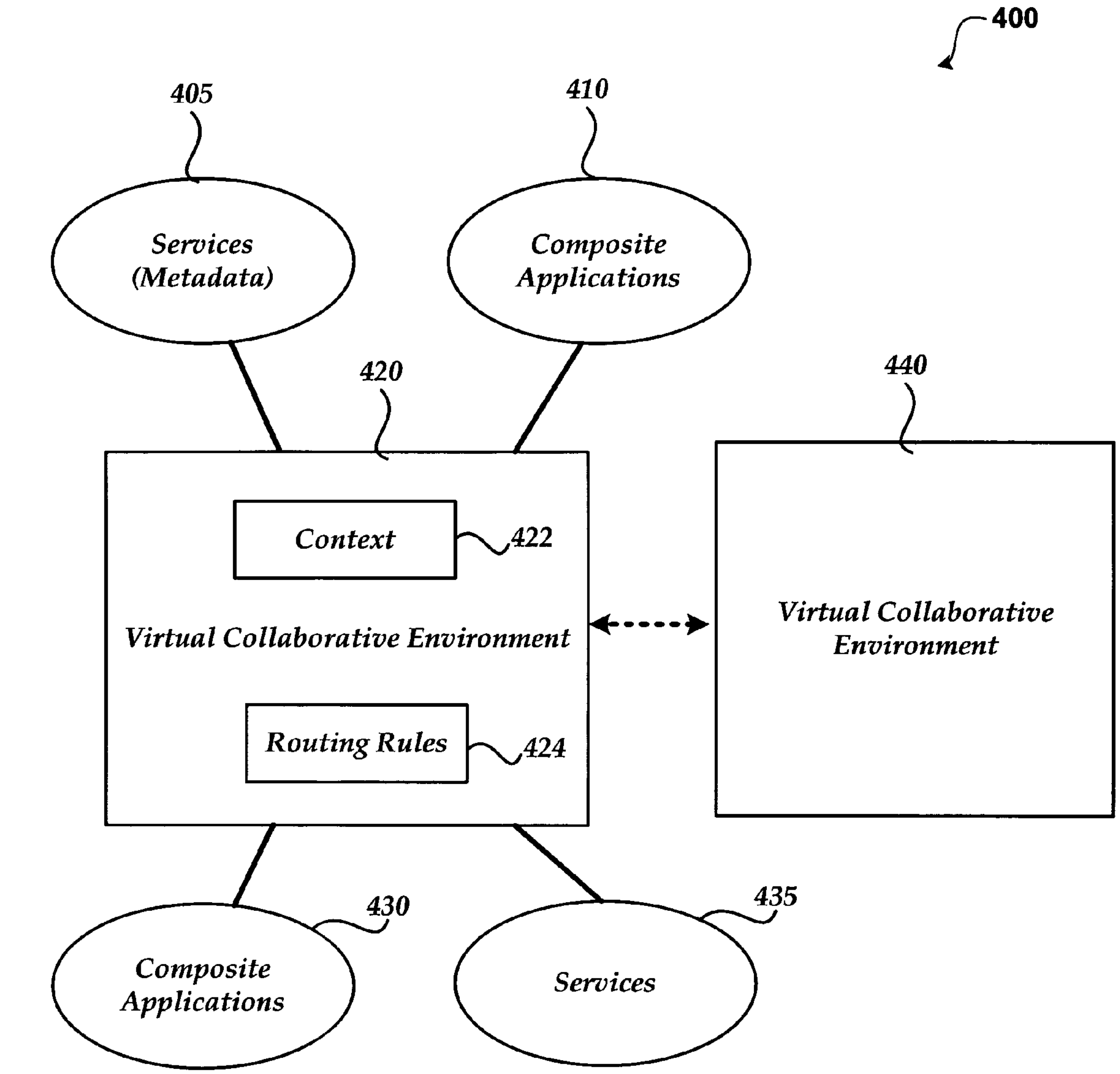
FIG. 4 shows a virtual collaborative environment.

FIG. 4 shows a virtual collaborative environment. As illustrated, virtual collaborative environment 400 includes virtual collaborative environment 420 that is linked to services 405 and 435, and composite applications 410 and 430. Virtual collaborative environment 422 specifies the message routing rules 424 and a collaborative context 422 for the services 405 and 435 and composite applications 410 and 430 that are included within the environment.

A user specifies the services or composite services that are included within the collaborative environment through the use tools that are associated with a service composition environment. A service composition design tool may be used to discovers services and/or collaborative services that are already included on a particular system or through a dynamic discovery process. The metadata that is associated with these services is obtained from these services either directly from the service itself or from a service repository that is associated with the service. This metadata information includes functional and non-functional polices, governance regulations, management aspects, and programmable binding information that relates to the services. This information may then be presented to the user for further configuration of the routing rules 424. The user creates appropriate routing rules 424 for the message/document exchange between the services based on the collaboration requirements of the application. The execution environment could enforce additional policies and routing behaviors such as applicable polices, messaging patterns, and required governance model. These behaviors are discovered and enforced on the context by the composition tools.

A collaborative context 422 for the composite service environment 400 is defined by inspecting each of the services and/or aggregated services that are contained within the environment. In addition, the context may be further contextualized based on the user's presence, location and other attributes related to an individual user acting on the scenario. Also service execution environment may further contextualized this context by applying the environment policies and rules. The collaborative context 422 is used for runtime decision making for exchanging messages between the services and composite applications as well as for the routing of messages between the services and the composite applications. The collaborative context 422 may initially define the routing rules for the messaging between the services which may then be modified by a user to further tune the system.

The service composition environment leverages existing and developing specifications, protocols, and technologies including but not limited to eXtensible Markup Language (XML), Simple Object Access Protocol (SOAP), the Web Services Description Language (WSDL), the Web Services Metadata Exchange (WS-MetadataExchange); domain-specific language (DSL) tools and software factories. The Web services use metadata to describe what other endpoints need to know to interact with them. For instance the WS-Policy specification describes the capabilities, requirements, and general characteristics of Web services; the WSDL specification describes abstract message operations, concrete network protocols, and endpoint addresses used by Web services; and the XML Schema describes the structure and contents of XML-based messages received by and sent by Web services.

Virtual collaborative environment 440 illustrates that a user may add other virtual collaborative environments to a single composition. When another virtual collaborative environment is added to the composition the context and routing rules are integrated with the new virtualized environment. Other virtual collaborative environments may be added to the composition at any time. When added, the added virtual collaborative environment discovers the existing virtualized environment's context and routing rules and integrates itself with the new virtualized environment FIGS. 5-9 illustrate building a composite application using a virtual collaborative environment. The exemplary tools illustrated in FIGS. 5-9 are not intended to be limiting, but are used for explanatory purposes. Other tools may be defined and implemented to create the composite application. The tool is used to create a collaboration context and a virtualized collaboration environment.

To create an application, a user launches the service composition environment. According to one embodiment, the functionality of the service composition environment is included within the Visual Studio environment by MICROSOFT COROPORATION®. Any development environment, however, may be used in creating the application. For example, a custom develop environment may be created or some other application program may be modified to incorporate the service composition tools. According to one embodiment, a user may build an Service Delivery Platform (SDP) solution, a context definition, a SDP web service, a smart device application as well as SDP service logic/workflow.

Figure 5:
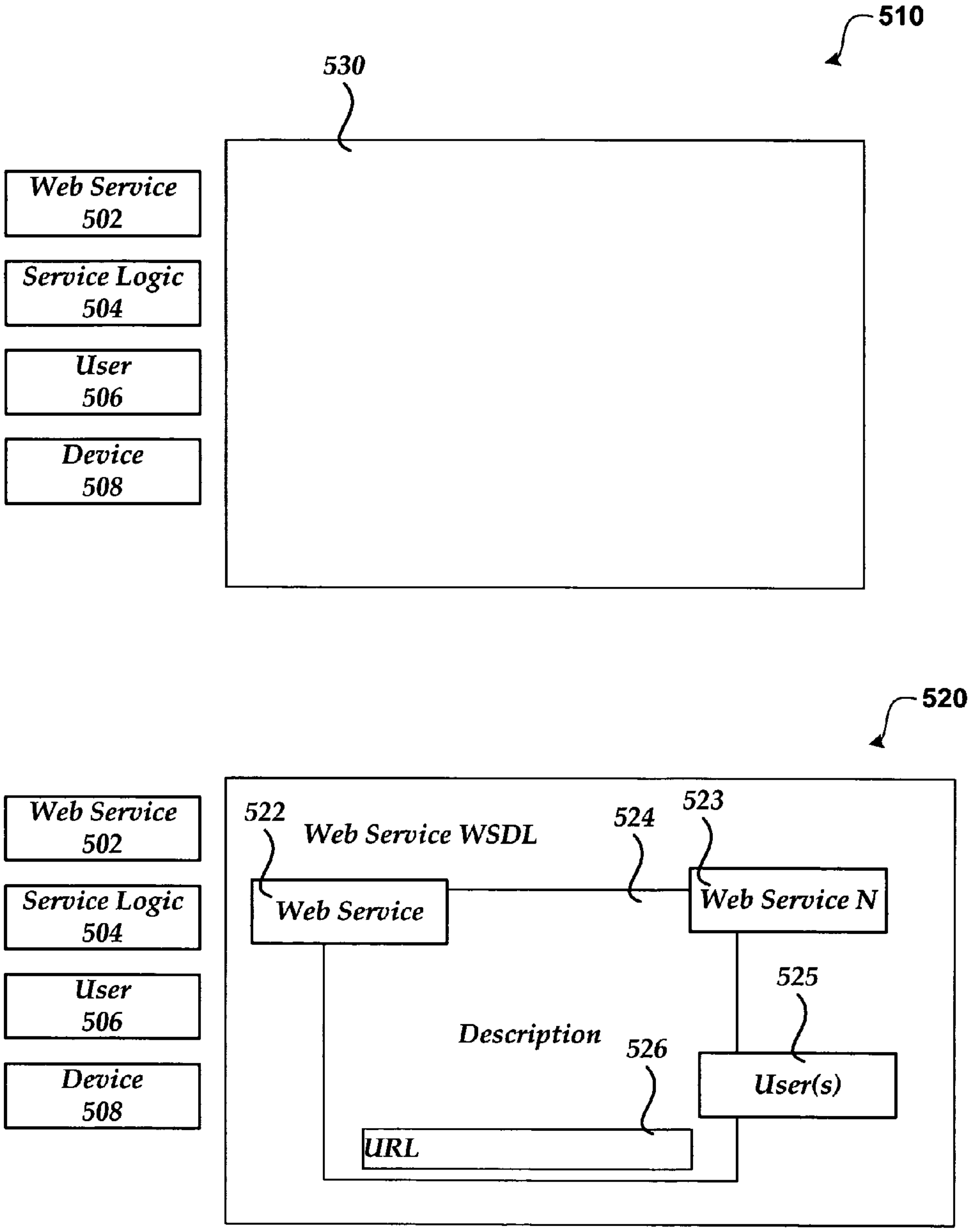

Referring now to FIG. 5, for explanatory purposes, assume the user is creating a SDP solution. When launched, a blank context designer window 530 is used as the work area to build the solution. Starting with an empty context designer window allows a user to add to the solution. As can be seen on the left hand side of the work area, the user may add one or more: web services 502; service logic 504; users 506 and devices 508 to the work area 530. Other options may also be presented to the user depending on the solution that is being created. Additionally, a user may open an already defined solution and use that solution as a starting point for the new solution. In that case, work area 530 would already be populated with services.

Referring to environment 520 a user has added a new web service 522 into the context When a web service is added to the context, a window 524 is provided to the user which allows the user to enter a URL 526 directly to access a desired web service. A search of the Services Directory may also be performed to find the web service. Locating the web service provides the service composition with the Web Service Description Language (WSDL) that is used within the context. The window 524 may also include information relating to the web service, such as a description of the service, binding, policy or other information relating to the service.

Figure 6:
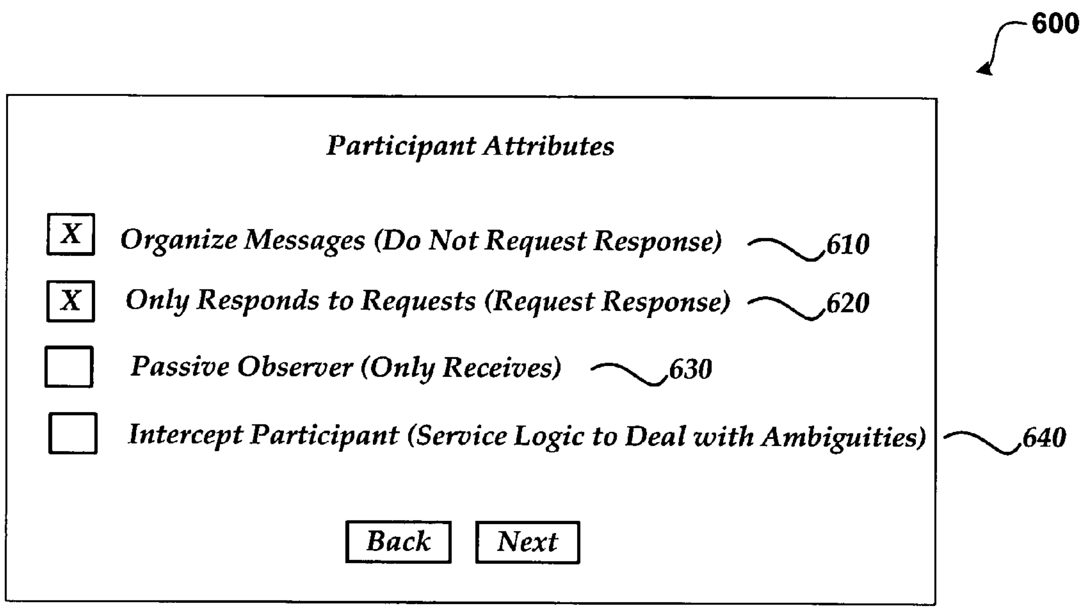

FIG. 6 illustrates setting participant attributes for newly added service. According to one embodiment, a wizard captures the participant attributes to apply to the participant. Many other methods, however, may be used to set the participant attributes some of which are shown in later figures and their related description. The participant attributes include an attribute: to organize messages (610); respond only to requests (620); passive observer (630); and as an intercept participant (640); and others. A user may select any of the attributes that apply to the participant. In the current example, the user has selected to originate messages without requesting a response and only responding to requests. The passive observer attribute 630 option allows the participant to receive messages but not respond to the messages. The intercept participant 640 allows the participant to handle any ambiguities. Ambiguities can occur when the message sent by one participant cannot be directly consumed by other participants and therefore require service logic to adjust for the differences. When an ambiguity is to be resolved then the participant is generally set as an intercept participant.

Figure 7:
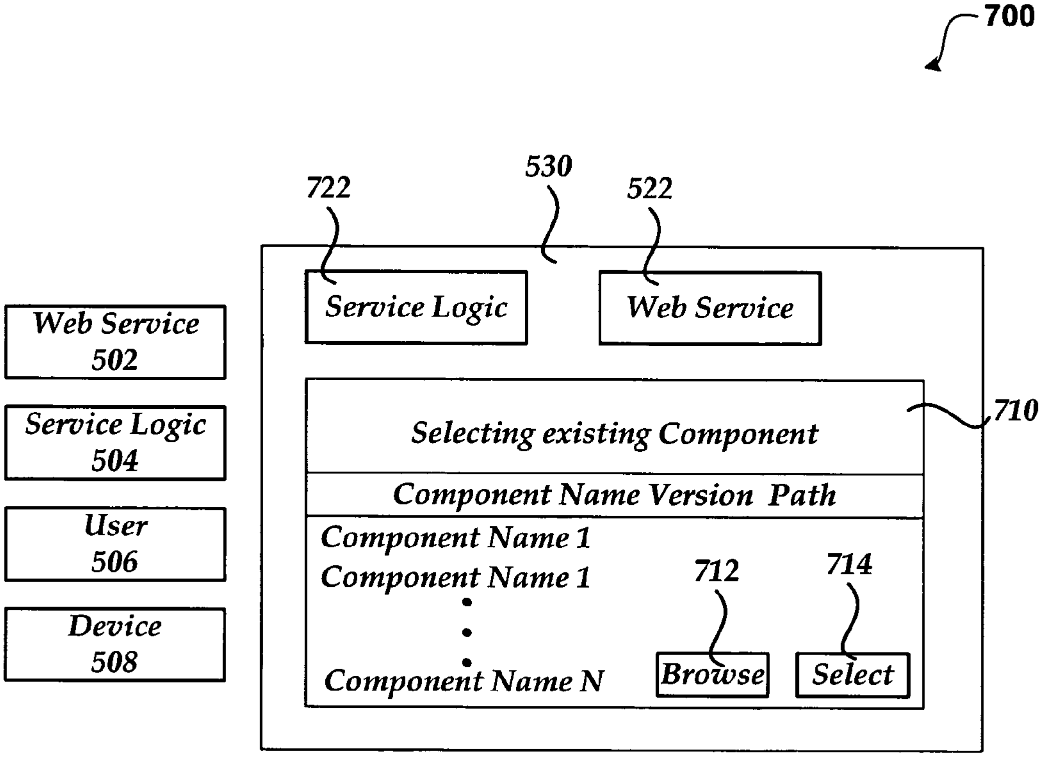

FIG. 7 shows adding a service logic component to the solution. After selecting service logic component 504 and dragging it onto the work area 530 a selection window 710 is presented to the user to add an existing service logic component. For example, the service logic component could be a NET or COM+ object. Other service logic components may also be utilized. The service logic component adds rules to the context and manage ambiguities and exceptions. Participant attributes for the service logic component may also be defined as shown in FIG. 6.

Figure 8:
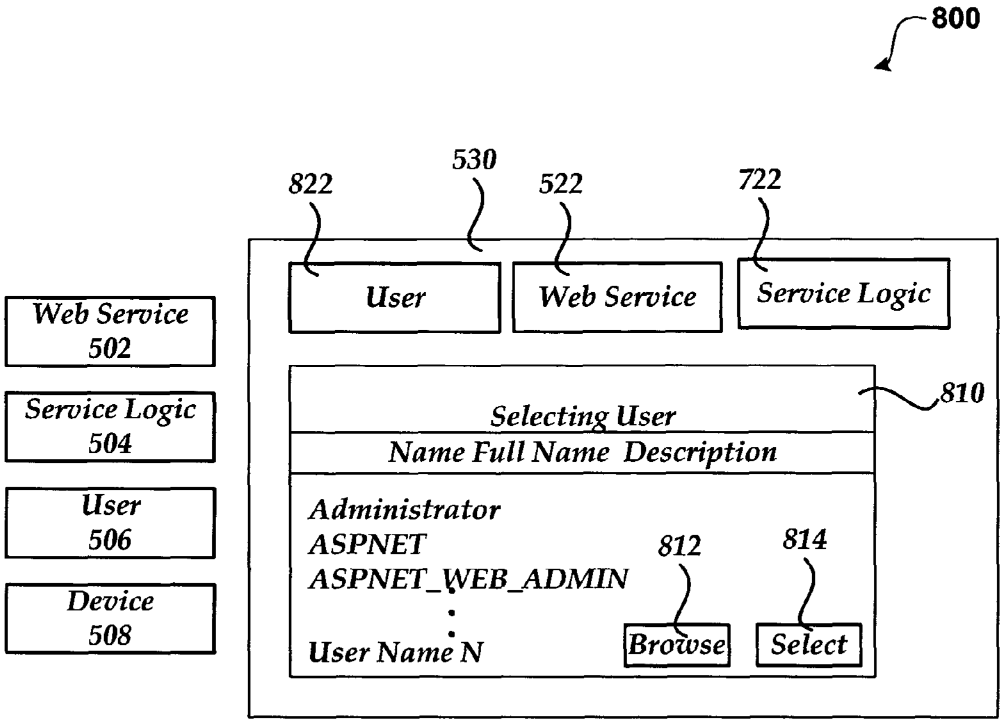

FIG. 8 illustrates adding a user to the solution. Similar to a web service, a user can add a new user component. Selecting user component 506 to work area 530 causes user selection window 810 to be displayed. When the credentials required for this service are known, they can either be automatically added or manually added into the context. The user credentials provide access to the user's persona which contains ID mappings for the various services in the context. This allows user identities to be mapped to the various service. This also invokes implicit identity management capabilities of the context. The user may use browse button 812 to locate more users or use the select button 814 to select the user.

FIG. 9 illustrates an exemplary XML description for a context. The following is exemplary XML that defines a context that includes three participants including two web services and a user.

```
<?xml version="1.0" encoding="utf-8" ?>
<ContextDefinition name="Mobile Device Setup">
  <ContextServer location="http://localhost:8085/SayHello" />
  <Configuration>
    <ConfigurationItem key="Security Services"
      value="http://localhost/SecurityService/SecurityService.asmx" />
  </Configuration>
  <Participant type="User">
    <Service>Security Services</Service>
    <UserID>text</UserID>
    <Password>xxx</Password>
    <WSDL>http://localhost/SecurityService/SecurityService.asmx</
    WSD>
  </Participant>
  <Participant type="Webservice">
    <ServiceCategory>Email Provider Service Provider</
    ServiceCategory>
    <ServiceName>Email Provider</ServiceName>
    <WSDL>http://localhost/Emailprovider/Emailprovider.asmx</
    WSDL>
  </Participant>
  <Participant type="Webservice">
    <ServiceCategory>Mobile Device Setup Service
    Provider</ServiceCategory>
    <ServiceName>Mobile Device Setup</ServiceName>
    <WSDL>http://localhost/MobileProvisioning/
    MobileProvisioning.asmx
    </WSDL>
  </Participant>
</ContextDefinition>
```

Figure 10:
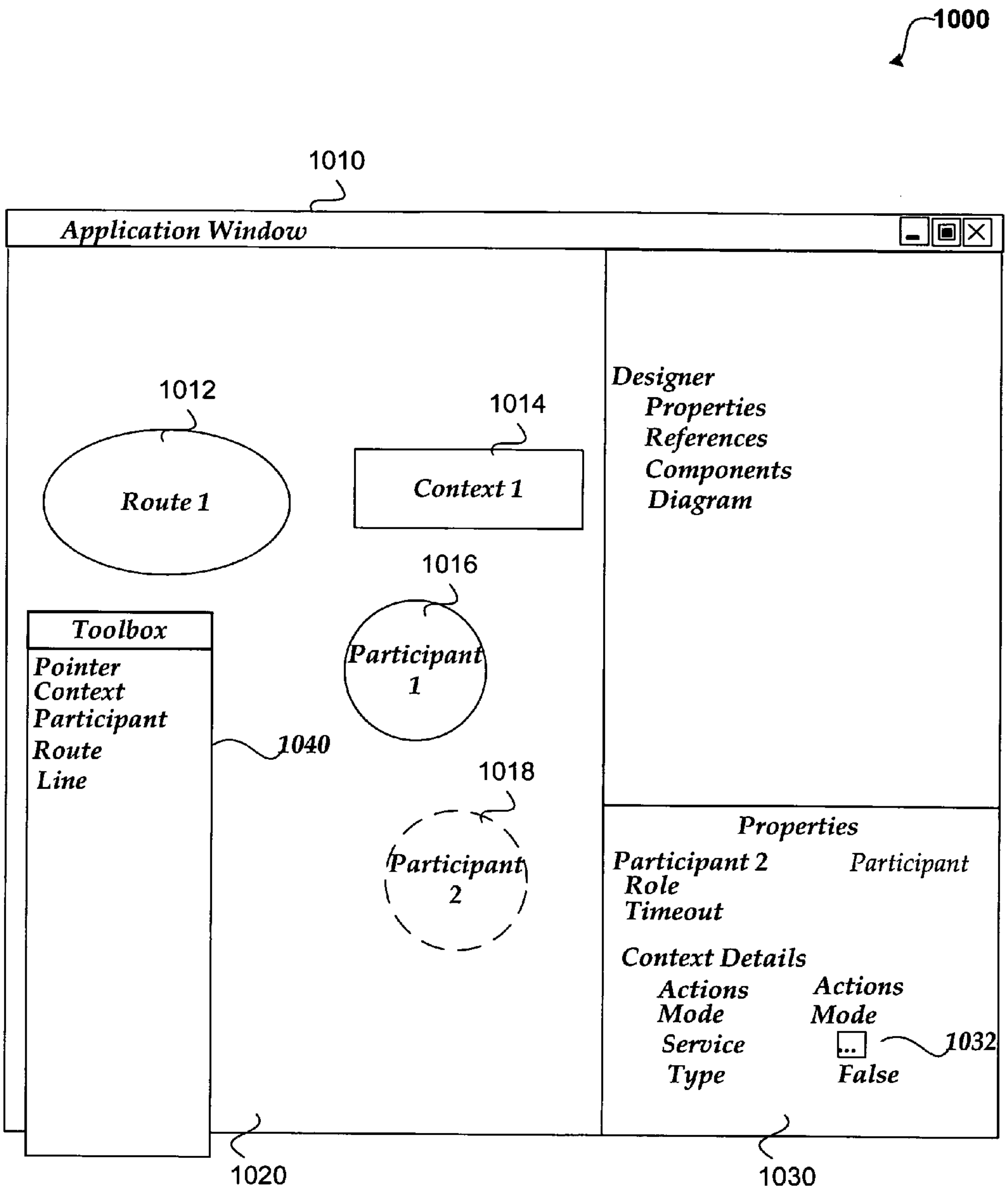
FIG. 10 illustrates another service composition environment for designing a context.

FIG. 10 illustrates another service composition environment for designing a context. Referring to FIG. 10 it can be seen that a route class 1012, context class 1014 and participant class 1016 and 1018 are on work surface 1020. Similar to the views provided in FIGS. 5-9, the work surface 1020 provides another approach for displaying the participant, routing and context information. In this example, the route class and context class are shown within the work area such that a user may easily select their representative icons and change the information that is contained within them.

Toolbox window 1014 may be used to add items to the work area 1020. For example, to add another Participant Class on the work area, a user clicks on the Toolbox 1040 and drags the icon representing the Participant Class onto the work area. The work area would then include the newly added participant class.

Participant 2 is shown with a dotted line around it to indicate that it is currently selected. Properties window 1030 allows a user to enter the properties for the Participant Class. In this example, the properties window shows the properties for the currently selected participant, participant 2. The default values that are initially populated for the participant class may also be modified using the properties window 1030.

Should the user desire to set the service attribute for participant 2 the user drills down to the service property 1032 and clicks on the icon next to the service property.

Figure 11:
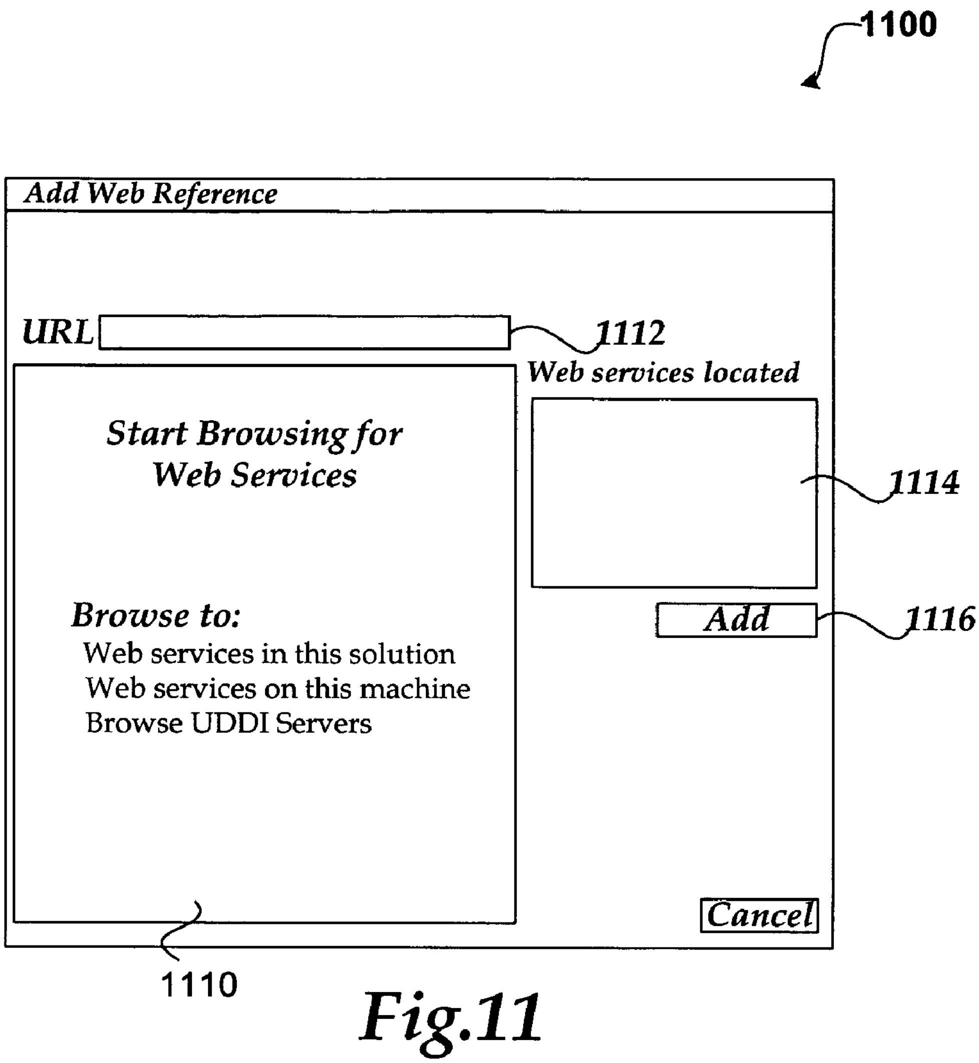
FIG. 11 illustrates a Web Service popup dialog box.

FIG. 11 illustrates a Web Service popup dialog box. Dialog 1100 allows a user to browse for the web service they would like to specify. Dialog 1100 is displayed in response to the user clicking on the icon next to the service property shown in FIG. 10.

Selecting one of the links under the Browse to: option in window 1110 allows the user to search for the web service that is currently in the solution; on the machine or on a server. The user may also directly enter the URL for the Web Service in URL box 1112. Selecting the Add button 1116 selects the Web Service and associates it with the participant that is currently selected. If the cancel button is selected or if dialog 1100 is closed no Web Service is selected.

Referring back to FIG. 10, once the properties are set for the classes that are displayed on the work area 1020, a user may create an XML representation of the collaboration context.

FIG. 12 shows an XML report for the classes that are displayed on the work area. The XML report includes the manifest details for the classes placed on the work area. The relevant attributes and element values are set from the properties for the classes. The following illustrates the XML created for the classes placed on the work area in the present example.

```
<Context>
  <ContextManifest timestamp="09/01/2006 00:00:00"
   serialize="Serialize" state="State"RouteAnyAction="False"
   AckOnRouteMsgToParticipant = "False">
   <ContextName>ContextName</ContextName>
   <ContextID>ContextID</ContextID>
   <Participants>
    Participant>
     <ParticipantManifest timeout="09/01/2006 00:00:00"
     role="Role" mode="Mode" type="False"
     service="http://msdn.com">
      <ParticipantName>"09/01/2006 00:00:00"</ParticipantName>
      <ParticipantUrl>"False"</ParticipantURL>
      <Actions>"Actions"</Actions>
     </ParticipantManifest>
    </Participant>
    <Participant>
     <ParticipantManifest timeout="01/01/0001 00:00:00"
     role="Role" mode="Mode" type="False"
     service="http://msdn.com">
      <ParticipantName>"01/01/0001 00:00:00"</ParticipantName>
      <ParticipantUrl>"False"</ParticipantURL>
      <Actions>"Actions"</Actions>
     </ParticipantManifest>
   </Participant>
  </Participants>
```

Figure 13:
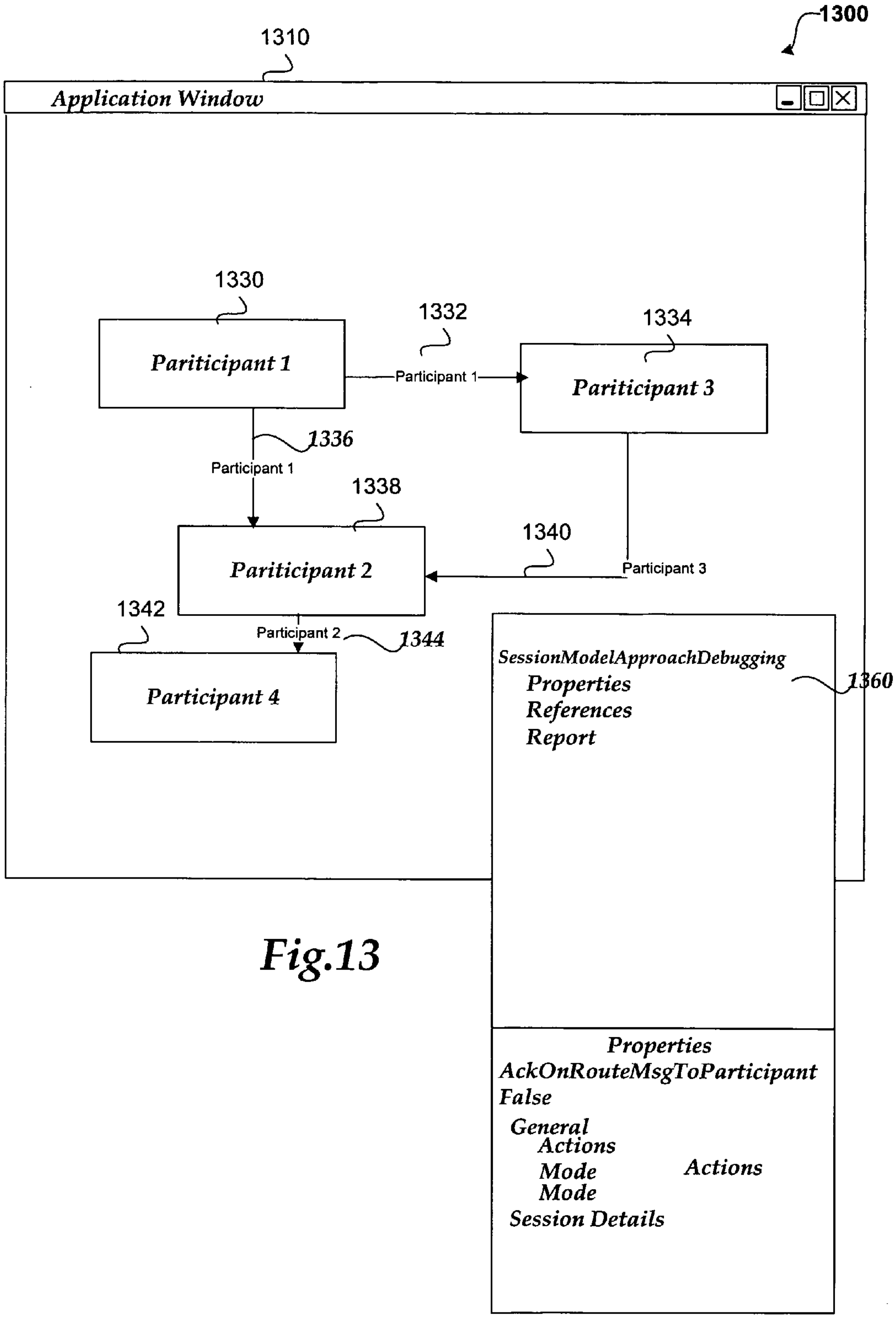
Figure 14:
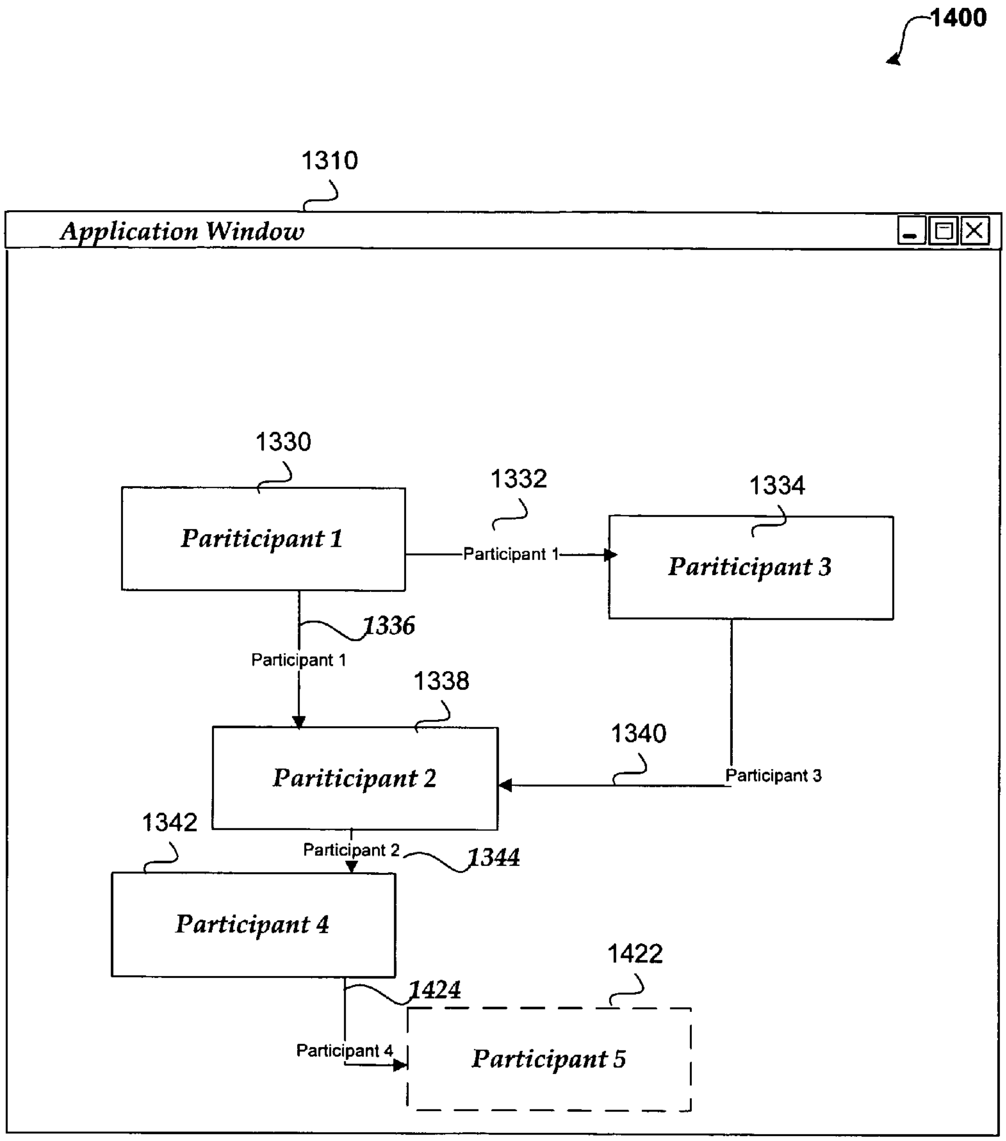

FIGS. 13-15 illustrate an exemplary context model in which a context can be referred to as the base model itself. As illustrated within the following diagrams, the participants (Participant 1 through 4) are the classes and the connecting the participants represent the routes. As illustrated in FIG. 13, there are four participant classes including participant 1 (1330); participant 2 (1338); participant 3 (1334) and participant 4 (1342). Participant 1 (1330) sends messages to participant 2 and participant 3. Participant 3 sends messages to participant 2. and participant 2 sends messages to participant 4. A window 1360 to edit the properties and debug the context model may also be provided. Alternatively, pop up windows, or some other type of window, may be displayed in response to a user selecting a participant or a route.

FIG. 14 illustrates adding a new participant to the work area 1310. According to one embodiment, the user selects the participant class and drags and places the icon representing the participant class on the work area. In the present example, the user has placed participant 5 (1422) beneath participant 4. After placing participant 5 the user connects it with a route 1424. Properties can be set for participant using the properties window (See 1360 in FIG. 13). For example, to set the participant properties the user selects the participant that they would like to set.

After setting the properties for the context class, the XML may be generated that represents the participants (classes placed on work area) and the routes (connectors). According to one embodiment, the XML is generated by selecting a menu option.

FIG. 15 illustrates a portion of the generated XML for the classes and the routes that were included in the work area illustrated in FIGS. 13 and 14. The resulting XML includes the relevant attributes and elements defined as properties.

```
<Actions>Actions4</Actions>
   <RoutingTable>
     <Routes>
     <Route>
       <Criteria>Participant 2</Criteria>
       <Intercept />
       <Destination>Participant 4</Destination>
     </Route>
     <Route>
       <Criteria>Participant 4</Criteria>
       <Intercept />
       <Destination>Participant 5</Destination>
     </Route>
    </Routes>
   </RoutingTable>
  </ParticipantManifest>
 </Participant>
<Participant>
<ParticipantManifest timeout="01/01/0001 00:00:00" role="0" mode=""
type="">
  <ParticipantName>Participant 5</ParticipantName>
  <ParticipantUrl>False</ParticipantUrl>
  <Actions />
  <RoutingTable>
 <Routes>
  <Route>
       <Criteria>Participant 4</Criteria>
       <Intercept />
       <Destination>Participant 5</Destination>
     </Route>
    </Routes>
   </RoutingTable>
  </ParticipantManifest>
  </Participant>
 </Participants>
 </ContextManifest>
</Context>
```

Figure 16:
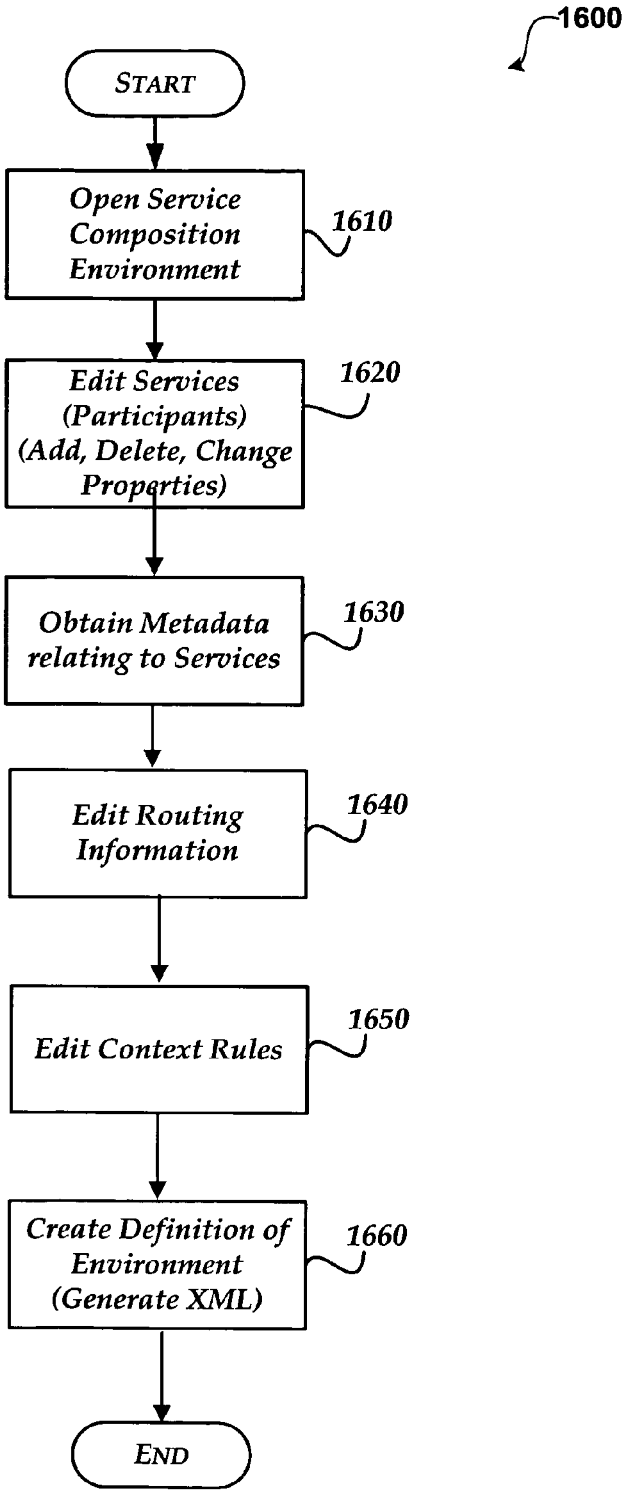
FIG. 16 illustrates a process for creating a context.

FIG. 16 illustrates a process for creating a context.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 1610, where the service composition environment is opened. The environment may be opened to create a new context, in which the context starts with no participants, or the environment may open a previously saved context. For example, the context could contain an individual service; a composite service; a description of a composite application or any combination thereof.

Flowing to operation 1620, a user may edit the participants to include within the context. The user may add, delete, or edit properties that are associated with the participants. The participants may include single services, composite services, aggregated composite services as well as applications that include on or more the defined services.

At operation 1630, when the services are defined, metadata that is associated with the services may be obtained that relates to the services. The metadata that is associated with these services is obtained either directly from the services or from a service repository that is associated with the service or from the execution environment. The metadata includes functional and non-functional polices, governance regulations, management aspects, and programmable binding information that relates to the services. This metadata may then be used to present the user for further configuration of the routing rules.

Flowing to operation 1640, the user edits the routing information for the message/document exchange between the services based on the collaboration requirements of the application. Initial routing information may be configured when the user graphically connects the services within the service composition environment.

Transitioning to operation 1650, the context rules may be edited. The context rules are used for runtime decision making for exchanging messages between the services as well as for the routing of messages between the services.

The process then moves to operation 1660 the XML may be generated for the information that is contained within the context. The XML represents the details for the participants, routes, and the context that is included within the context. The relevant attributes and element values are also defined from the properties for the classes. Although XML is used to represent the information that is contained within the context, some other language may be used to describe the information within the context.

The process then moves to an end operation and returns to processing other actions.

Figure 17:
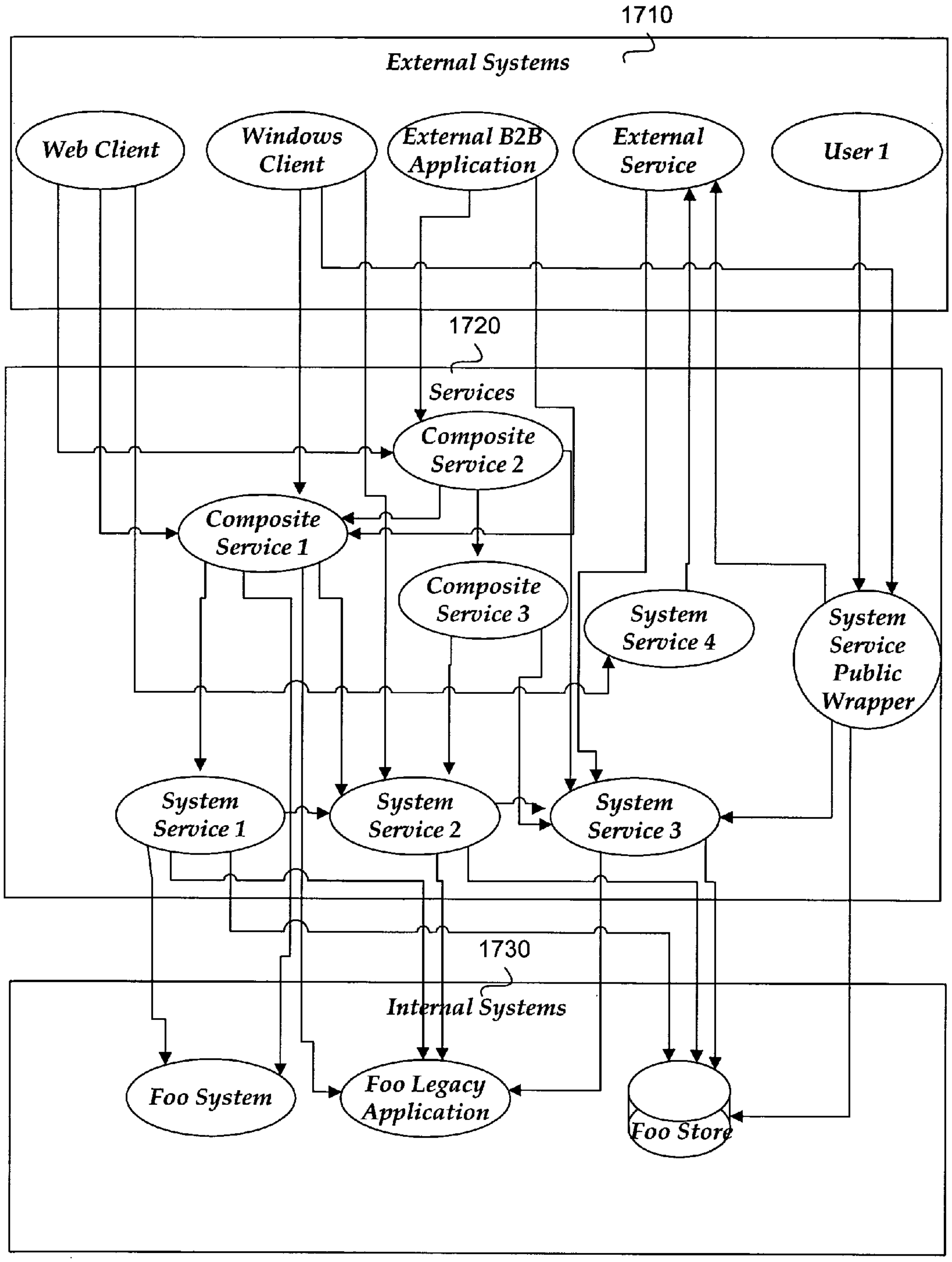
FIG. 17 shows a random service composition pattern.

FIG. 17 shows a random service composition pattern. External systems 1710 are coupled to services 1720 which are coupled to internal systems 1730. The random service composition pattern illustrated does not utilize design pattern thereby resulting in a chaotic composition of services. Without a design pattern to compose services in a standard well-defined manner the services may be composed at random from other services across the enterprise resulting in many unneeded connections and routing information. Among other problems, a random composition is difficult to maintain since it generally results in a complex web of disorganized services with no clear boundaries. The random composition of services also blurs the boundary between private services internal to the enterprise and services publicly exposed by the enterprise which can also result in security problems. As illustrated, all of the public and private services are contained within services 1720.

Figure 18:
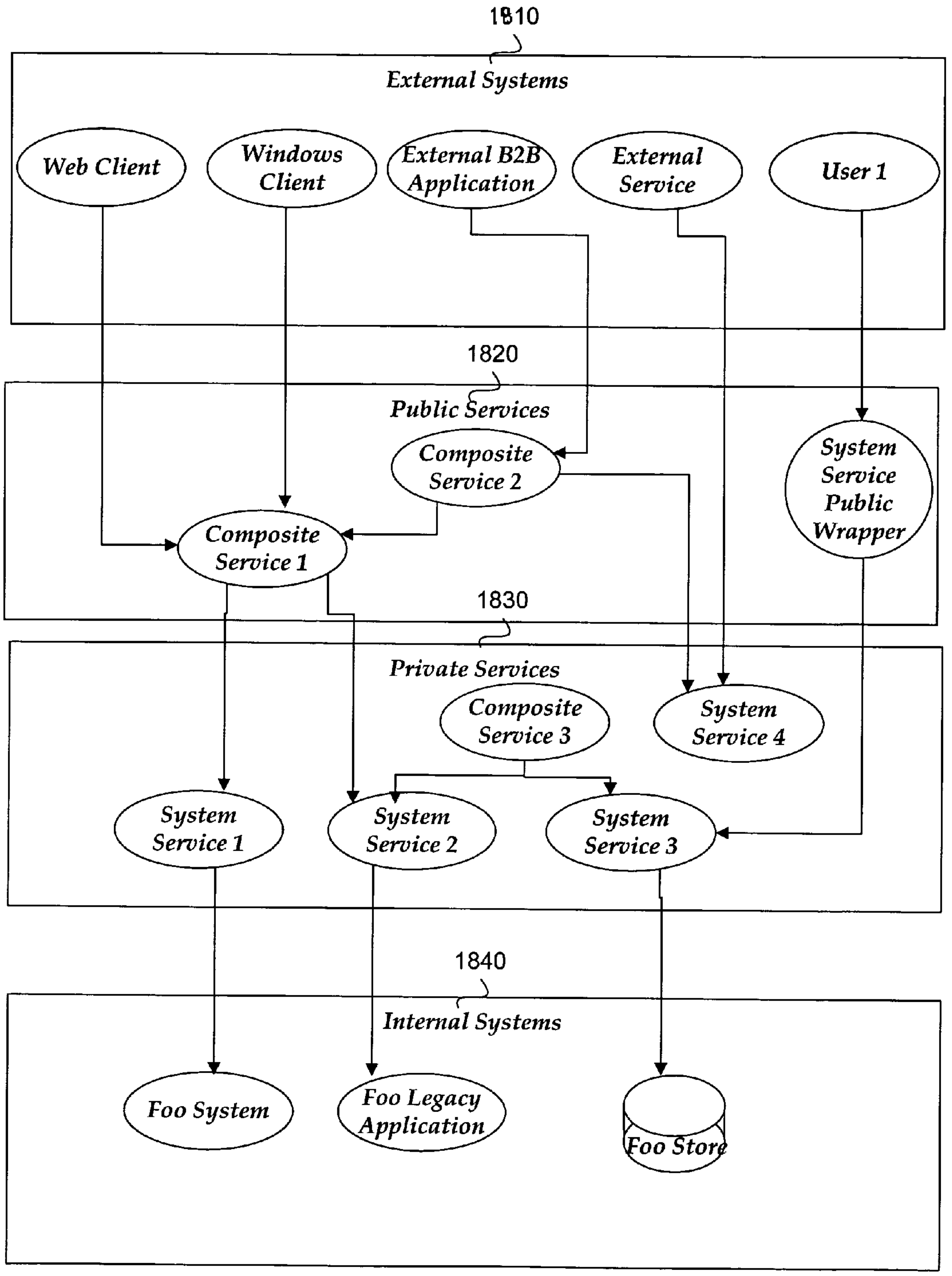
FIG. 18 illustrates a service composition pattern following a design pattern.

FIG. 18 illustrates a service composition pattern following a design pattern. FIG. 18 shows the application of the design pattern to the random service composition diagram illustrated in FIG. 17. As can be seen by comparing FIG. 17 with FIG. 18, there are fewer connections between the services in FIG. 18 thereby resulting in a composition pattern that is more easily maintainable as compared to the random composition pattern. A service composition design pattern is directed at addressing the problem of creating composite services within an enterprise with several internal systems and several external clients & external services (such as B2B services) that need access to these internal systems.

According to one embodiment, the services in the enterprise are one of three types (System Services, Composite Services and Public Wrappers) which each follow a set of routing rules.

According to one embodiment, the system services use the following rules. System services are specific to and talk directly to one system. As used herein, system may refer to a data store, a legacy system, a legacy service, a business application, and the like. System could also mean another system service or an external system. System services communicate with the system determined in the first rule. In other words, the system services do not talk to other services or other systems. Third, the system services act as wrappers around a specific system. There is a single system service to access a particular system in the enterprise. System Services are private to the enterprise and not exposed for consumption by external systems. A System Service can be accessed externally using a composite service or using a public wrapper around the system service.

According to one embodiment, composite services use the following rules. Composite services are composed of at least two services and talk to two or more services. If a service only communicates with one service, then that service is a system service. Composite services do not communicate directly with systems but to other services. They can talk to internal systems using a system service or indirectly using another composite service. Composite services can be exposed for external consumption (although there can also be private composite services internal to the enterprise) A specific external system (user/client/application/service) can communicate to this enterprise using a single composite service. A single composite service, however, can service multiple external systems. A composite service does not directly call an external service. It can access an external service using a system service wrapper around the external service.

According to one embodiment, public wrappers use the following rules. Public wrapper services are wrappers around private services in order to expose them to the outside world in a secure manner. Public wrappers talk to one private (system or composite) service.

Applying the above rules results in the service composition illustrated in FIG. 18. Referring to FIG. 18 it can be seen that there is a clear differentiation between the public services 1820 and private services 1830. Additionally there are fewer connections between external systems 1810, public services 1820, private services 1830 and internal systems 1840. This composition process and tools are used in the Service composition process to further advance the capabilities of the tools described in FIGS. 5-14 and the process defined in FIG. 16.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing a virtualized collaboration environment, comprising:

defining services within a service composition environment; wherein each of the services relate to an individual service; or a composite service that combines at least two or more individual services; or an aggregated composite service that combines at least two or more composite services;

obtaining information relating to each of the services; wherein the information includes functional and non-functional policies, governance regulations, management aspects, and programmable binding information that relates to each of the services;

obtaining information relating to the execution environment; wherein the information includes functional and non-functional policies, governance regulations, management aspects, and programmable binding information that relates to a hosting environment;

defining routing information to link each of the services;

defining a collaborative context that includes rules that are used during runtime to control the exchange and the routing of messages between the services in the service composition environment;

wherein defining the routing information to link each of the services and defining the collaborative context further comprises applying a design pattern to the services;

wherein the design pattern includes routing rules that define allowed connections between the services;

creating a definition of the environment based on the services; the obtained information; the routing information; and the collaborative context; and adding and integrating a second virtualized collaboration environment to the virtualized collaboration environment; and when added the second virtual collaborative environment discovers the existing virtualized collaboration environment's context and routing rules and integrates itself with the virtualized environment's context and routing rules such that the second virtualized collaboration environment becomes a part of the existing virtualized collaboration environment.

2. The method of claim 1, wherein obtaining the information relating to each of the services comprises obtaining metadata either directly from each of the services or from a service repository.

3. The method of claim 2, wherein obtaining the metadata for each of the services comprises obtaining the metadata from the execution environment.

4. The method of claim 1, wherein creating the definition comprises generating an XML representation that defines the services, the routing rules associated with the services; properties relating to the services and the collaborative context.

5. The method of claim 4, further comprising setting attributes for each of the services; wherein the attributes specify how the service is to interact with messages associated with one or more of the services.

6. The method of claim 1, further comprising simulating an execution of the environment and validating the services defined within the service composition environment.

7. The method of claim 1, wherein the design pattern specifies the routing rules for system services, composite services and public wrappers.

8. A computer-readable memory having computer-executable instructions for providing a graphical tool for defining a context, the instructions comprising:

displaying a work area that is used to define participants; routing rules and collaborative context rules for the context; wherein the participants include at least two aggregated composite services;

displaying participants for the context within the work area;

displaying routing information within the work area; wherein the routing information connects the participants; and displaying the collaborative context rules within the work area; wherein the collaborative context rules control the exchange and the routing of messages between the participants in the context; wherein the routing information and the collaborative context rules further comprises applying a design pattern to the services; wherein the design pattern includes routing rules that define allowed connections between the services; wherein when a second defined context is added, the second defined context discovers the existing defined context's context and routing rules and integrates itself with the defined context's context and routing rules such that the second defined context becomes a part of the defined context.

9. The computer-readable memory of claim 8, further comprising determining when a participant is added to the work area.

10. The computer-readable memory of claim 9, further comprising automatically determining metadata information that is associated with the participant after the participant is added to the work area.

11. The computer-readable memory of claim 8, further comprising determining when a web service is added to the work area.

12. The computer-readable memory of claim 8, further comprising displaying a dialog box to locate Web Service Description Language (WSDL) for the web service.

13. The computer-readable memory of claim 8, further comprising determining when a route is added to the work area; and when a route is added to the work area creating a routing rule between at least two of the participants.

14. The computer-readable memory of claim 9, further comprising displaying a dialog box to set participant attributes.

15. The computer-readable memory of claim 8, further comprising determining when a service logic component is added to the work area; wherein the service logic component adds rules to the context and manages ambiguities and exceptions.

16. The computer-readable memory of claim 8, further comprising determining when a user component is added to the work area; wherein the user component specifies credentials for one or more services in the context.

17. An apparatus, comprising:

a processor and a computer-readable medium;

an operating environment stored on the computer-readable medium and executing on the processor;

a display; and an application operating under the control of the operating environment and operative to perform actions, including:

editing services within a service composition environment to create a virtualized collaboration environment; wherein the services within the service composition environment comprise an individual service and at least two aggregated composite services that aggregate at least a composite service with at least another composite service;

determining when a service is added and when the service is added: obtaining metadata relating to the service; wherein the metadata includes functional and non-functional policies, governance regulations, management aspects, and programmable binding information that relates to the service;

editing routing rules; wherein the routing rules link each of the services;

editing a collaborative context that controls the exchange and the routing of messages between the services;

wherein the routing rules and the collaborative context further comprises applying a design pattern to the services; wherein the design pattern includes routing rules that define allowed connections between the services;

adding and integrating a second virtualized collaboration environment to the virtualized collaboration environment; and when added the second virtual collaborative environment discovers the existing virtualized collaboration environment's context and routing rules and integrates itself with the virtualized environment's context and routing rules such that the second virtualized collaboration environment becomes a part of the virtualized collaboration environment;

generating an XML definition that defines the services, the routing rules; properties relating to the services and the collaborative context; and the second virtual collaborative environment.

18. The apparatus of claim 17, wherein the application is further configured to set attributes for each of the services; wherein the attributes specify how the service is to interact with messages associated with one or more of the services.

19. The apparatus of claim 17, wherein the application is further configured to graphically display the services and routing information on the display.

* * * * *